Jan. 13, 1931.  A. NYMAN  1,789,263
ELECTRICAL CONDENSER
Filed Feb. 26, 1925  3 Sheets-Sheet 1
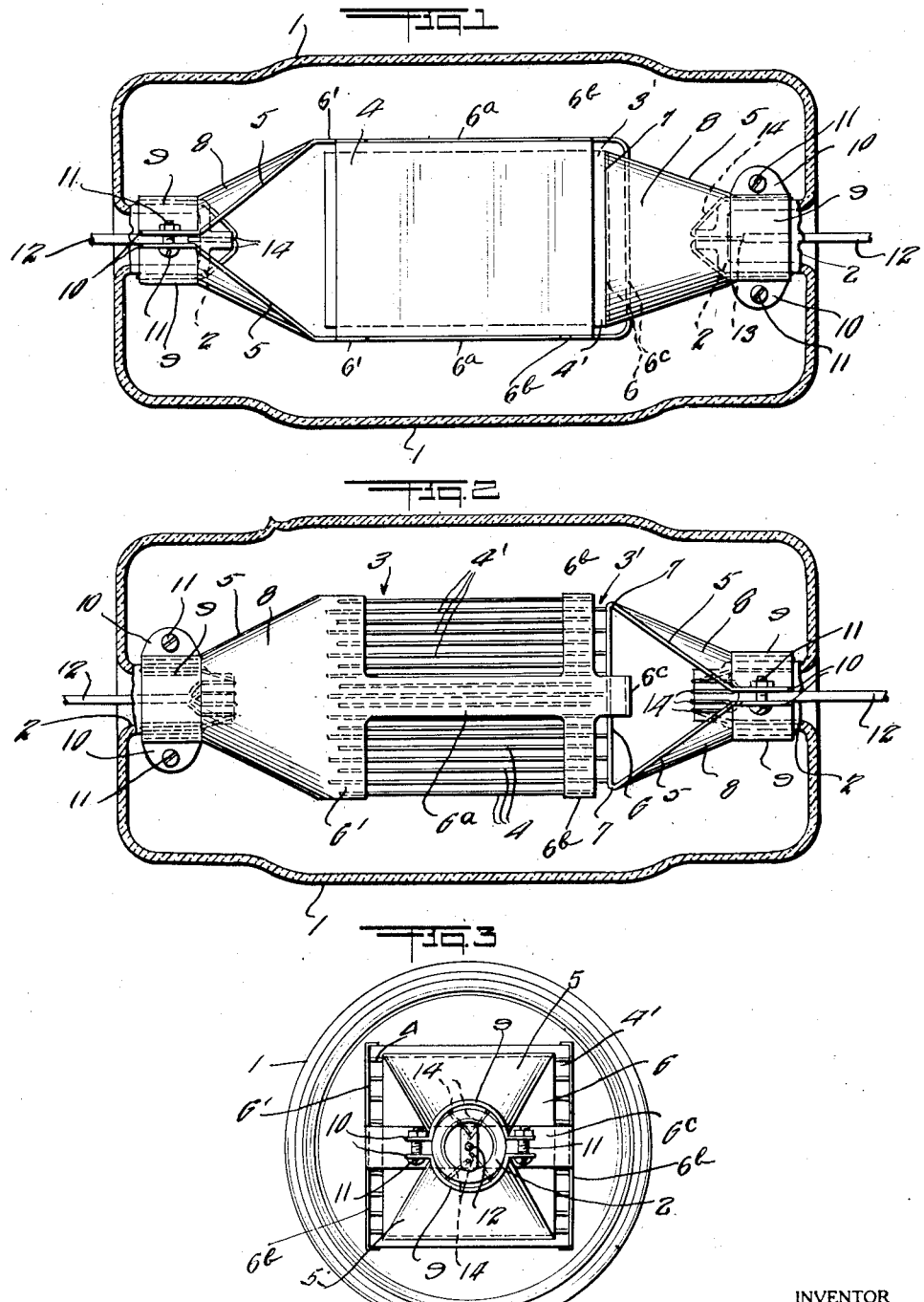
INVENTOR
ALEXANDER NYMAN
BY
Van Deventer + Nickel
ATTORNEYS Jan. 13, 1931.　　　A. NYMAN　　　1,789,263
ELECTRICAL CONDENSER
Filed Feb. 26, 1925　　　3 Sheets-Sheet 2
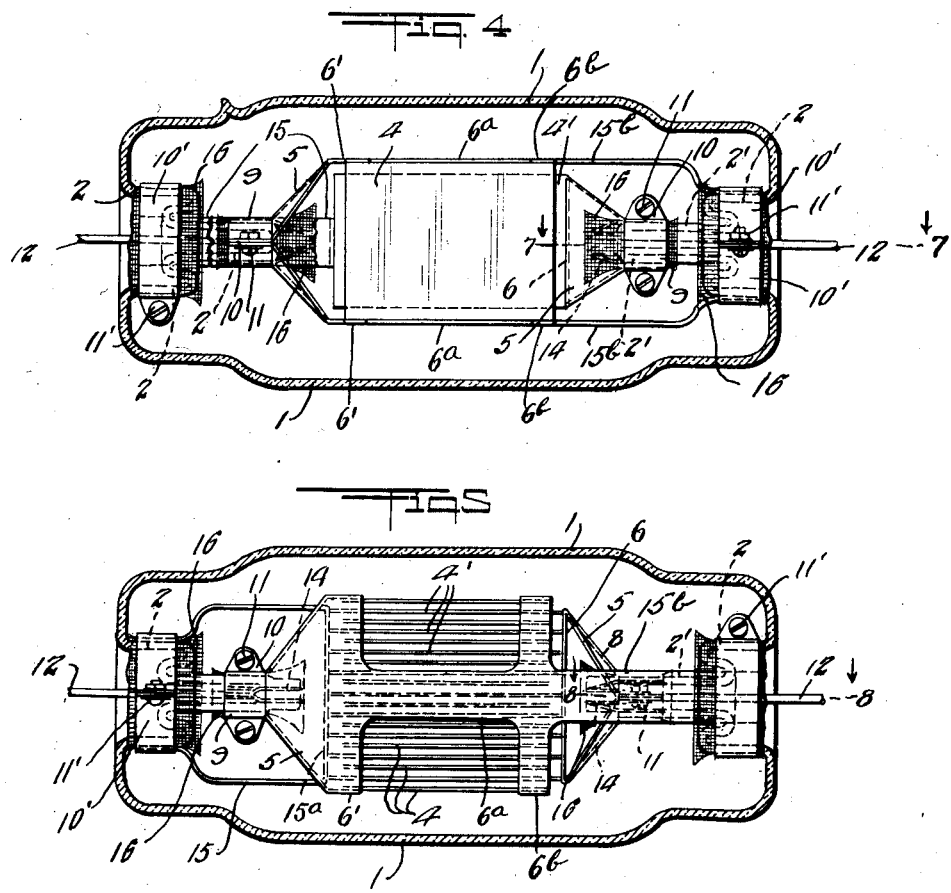
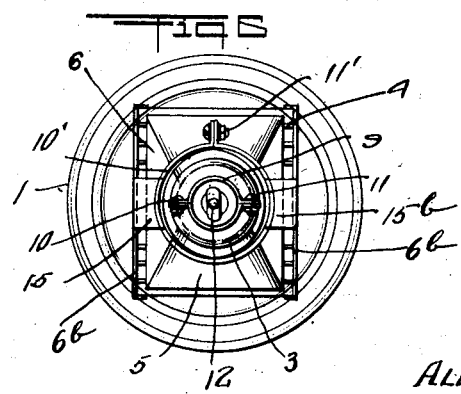
INVENTOR
ALEXANDER NYMAN
BY
Van Deventer & Nickel
ATTORNEYS

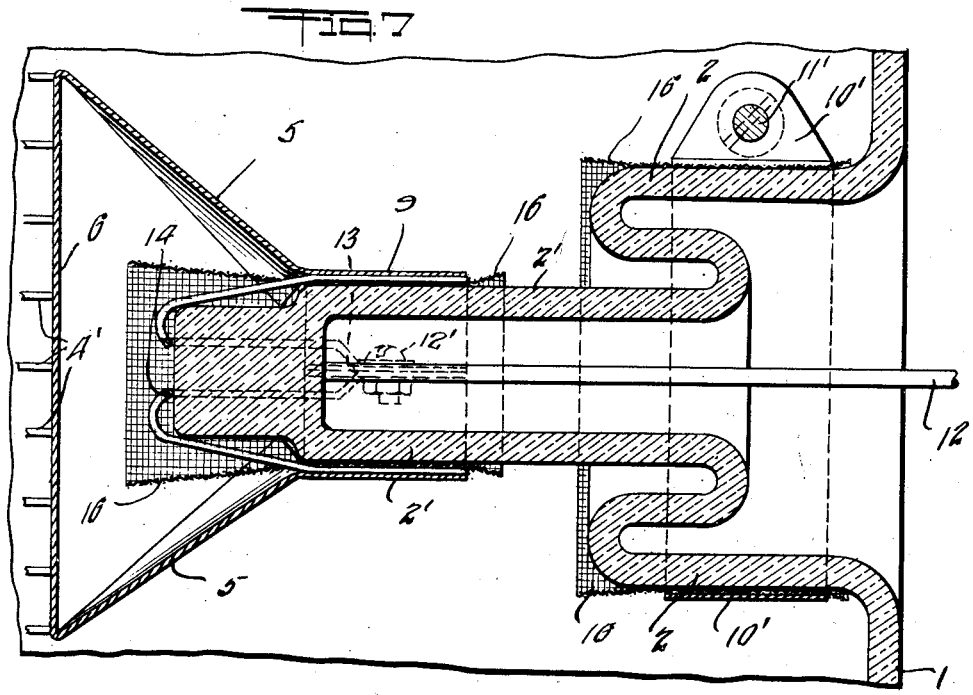

Patented Jan. 13, 1931

1,789,263

UNITED STATES PATENT OFFICE

ALEXANDER NYMAN, OF NEW YORK, N. Y., ASSIGNOR TO DUBILIER CONDENSER CORPORATION, OF NEW YORK, N. Y., A CORPORATION OF DELAWARE

ELECTRICAL CONDENSER

Application filed February 26, 1925. Serial No. 11,809.

My invention relates to an improved electrical condenser; particularly a condenser enclosed in a vacuum.

An object of my invention is to provide a condenser mounted within an exhausted vessel and designed for operation at high voltage and high frequency and with greatly reduced losses.

Another object of my invention is to provide a condenser having plates or elements of opposite polarity in a suitable container, well insulated and firmly secured in place.

A further object of my invention is to provide a condenser which is strong in construction and not liable to get out of order even after long and constant use.

With these and other objects in view, which may be incident to my improvements, the invention consists in the parts and combinations to be hereinafter set forth and claimed, with the understanding that the several necessary elements comprising my invention, may be varied in shape, proportions and arrangement, without departing from the spirit and scope of the appended claims.

In order to make my invention more fully comprehended, I have shown in the accompanying drawings means for putting the same into practice, without limiting the improvements to the particular apparatus, which for the purpose of explanation, has been made the subject of illustration.

In the drawings:

Figure 1 is a side elevational view of my condenser showing a vertical section of the container;

Fig. 2 is a plan view of my condenser showing a horizontal section of the container;

Fig. 3 is an end view of the condenser seen from the right of Figure 2;

Fig. 4 is a side elevational view showing a modification of my condenser, the container being in vertical section;

Fig. 5 is a plan view of said modification showing a horizontal section of the container;

Fig. 6 is an end view of said modification seen from the right of Fig. 5;

Fig. 7 is a detail sectional view on line 7—7 of Fig. 4 of the support for the condenser showing the connections to the sealed-in lead wire;

Fig. 8 is a detail sectional view on line 8—8 of Figure 5 of a support for the condenser showing a modification of the connections in Fig. 7.

Referring to the drawings, and more particularly to Figs. 1 and 2, I have shown a condenser having an exhausted casing or container 1, of glass or other material, with inwardly projecting stems 2, upon which are mounted groups of plates of conductive material 3 and 3′, made up respectively of parallel plates 4 and 4′. The groups of plates 3 and 3′ are attached to supports or members by means of which the plates or elements are mounted upon the inwardly projecting sealed-in stems 2.

The members to which the plates in groups 3 and 3′ are attached are each made up of two converging sections 5. The sections 5 of the support at the right end of the condenser in Figure 2 are connected together by a base portion 6 fastened to said sections 5 along lines 7. The surfaces of all the sections 5 are transversely curved as at 8; and all the sections terminate in semi-circular bands 9 which have perforated lugs 10 formed integral with the bands at their opposite extremities. The bands 9 encircle the stems 2 and are held fast to stems 2 by suitable screw means 11 engaging the lugs 10, the bands and screws constituting clamps for affixing the supports on the inside of the casing 1.

The structure and method of mounting, as shown in Figs. 1 and 2, provide a strong condenser that will withstand jolts and more than ordinary rough usage without disarrangement of the condenser in the casing 1. The stems 2 being formed integral with the container, provide strong bosses upon which the plates 4 and 4′ can be mounted. The supports or members comprising the sections 5 provide connections between the plates of each group and at the same time attach the plates to the parts of the casing intended to hold the plates in position.

The plates in each group are connected across their adjacent extremities. One group of plates 4′ is connected at the extremities of said plates at the right by means of the portion 6, the other extremities of said plates being free. The other group 4 is connected at one end to extensions 6' at the wide ends of the sections 5 of the other support. From the extensions 6' project central bars 6a above and below the plates 4, bearing cross arms 6b, and connected at their extremities by a part 6c, the opposite ends of the plates 4 being also secured to the bars 6b. The plates 4 of course intervene between the plates 4'. The part 6c is between the sections 5 of the support for the plates 4. The condenser is connected to an external circuit by means of suitable lead wires 12. The lead wires 12 penetrate the projections 2, and are connected at points 13 to wires 14 which are within the container and extend between the semi-circular bands 9 and the stems 2. Thus the plates 4 are all united and mounted on one stem, while plates 4' are united and mounted on the other stem; but the two groups of plates are separated and can be united to opposite terminals of an electric circuit in which the condenser is to work.

Referring to Figs. 4 and 5, I have shown a modification of my condenser wherein the container 1 is provided at both ends with bosses 2 having reduced extremities 2' integral with the bosses 2. The plates 4 and 4' are mounted in much the same manner as shown in Fig. 1. The plates 4' terminate at the right in a base 6 attached to sections 5, clamped upon the extremity 2' of the adjacent boss 2; and at the left, the same plates are connected by a cross bar 15a, with extensions 15 fastened by a clamp 10' and screw 11' upon the main part of the adjacent boss 2.

The other plates 4 are secured at the left to extensions 6' of sections 5, as before, clamped to the extremity 2' of the adjacent boss 2; and at the right to cross arms 6b, of bars 6a; these bars having extensions 15b, held by a clamp 10' and screw 11' to the boss 2 at the right. The sections 5 at the two ends are at right angles to each other, and so are the extensions 15 and 15b. The condenser is connected to an external circuit by means of the leads 12 which are sealed in the stems 2. Wires 14 are united to the leads 12, and as before, pierce the extremities 2' of the stems 2 and are held at their inner ends under the bands 10. Part of the wires 14 are thus connected through two of the sections 5 to the plates 4' and part of the wires 14 through the other two sections 5 to the plates 4. The extensions 15 and 15b are merely additional supports.

The relatively large diameter for the inwardly projecting stems 2, as indicated in Figs. 4 and 5 is to provide a stronger mounting for the plates.

Between the large clamps 10' and the extensions 15 and 15b are pieces of wire gauze 16 which extend around the stems 2 and are of a slightly greater length than the stems. A similar piece of wire gauze is mounted on each extremity 2' and is placed between the wires 14 and the semi-circular bands 9 which encircle the extremities 2'.

The purpose of the wire gauze is to eliminate electrical tension or potential around the conductors 14 where they pass through the glass of each stem 2; and on the heads 18 where they engage the stems 2. For example, at the left of Figure 5, a difference of potential would exist between the arms 15, connected to plates 4, and the adjacent bands 9 and conductors 14 connected to the plates 4, but with the gauze 16 in place, this difference of potential is caused to exist between the arms 15 and the gauze; and tension on the conductors 14 in the glass is prevented. Otherwise, electrical tension at the conductors 14 might puncture the container and destroy the vacuum therein.

The gauze 16 on the thick part of each extremity serves to afford a good grip for the clamps 10', and the gauze on the extensions 2' also serves in the same way for the bands 9.

Referring to Fig. 7, I have shown in detail a method for connecting the lead in wires 12 with the wires 14 which are within the condenser. The wires 14 extend through a small projection on the extremity 2' and are attached to the lead in wire 12 by screw means 12'. The wire gauze 16 is shown wrapped around a reduced extremity 2' and is placed between the extremity and the semi-circular bands 9 of the adjacent sections 5, and the inner ends of the wires 14 can lie on the gauze 16 covering the extremity 2'.

Referring to Fig. 8, I have shown a modification which may be used to connect the wires within the container to the external leads which join the condenser with an electric circuit. The wires 14 within the container, lying between the gauze 16 and the semi-circular bands 9 of the adjacent sections 5 are attached to screw studs 17. The studs are screwed into a metal head 18, which has a sharpened end to be sealed or secured to the end of the extremity 2' in any way which will give an airtight connection.

Extending through the stem 2 and extremity 2' is a rod 19, which is screwed into the metal head 18, as indicated by the numeral 20. The rod 19 is connected with a lead 12 by a suitable screw means 12'. The leads 12 are used to connect the condenser unit with an external circuit.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

Having described my invention, what I believe to be new and desire to secure and protect by Letters Patent of the United States is:—

1. An exhausted container having two inwardly projecting bosses, conductive elements having the form of plates with extended surfaces in the container, a support affixed to part of said elements, and a second support affixed to the remaining elements, each support terminating in a clamp, the supports being secure upon the bosses by said clamps.

2. An exhausted container having two inwardly projecting bosses, conductive elements having the form of plates with extended surfaces in said container, and supports for said elements, each support comprising two sections, each terminating in a clamp to secure the sections upon said bosses.

3. An exhausted container having two inwardly projecting bosses, conductive elements having the form of plates with extended surfaces in the container, and supports affixed to said elements, each support comprising two convergent sections terminating in semi-circular bands encircling said bosses, and securing the supports thereto.

4. An exhausted container having two inwardly projecting bosses with reduced extremities, a condenser unit comprising two groups of elements, each group being mounted at one end upon one of said bosses, and the reduced extremity of the other boss at the opposite ends.

5. A container having an insulating projection, a conductive element secured to one part of said projection, another conductive element secured to another part of said projection, and means associated with one of said parts between said elements to protect said projection from the electrical tension thereat.

6. A container having an insulating projection, a conductive element secured to one part of said projection, a second conductive element secured to another part of said projection, a piece of gauze enveloping each of said parts, and spaced from each other, one of said pieces of gauze being connected to one conductive element, and the other piece to the remaining element.

7. A container having an insulating projection with a reduced extension, a conductive element secured to a part of said projection of relatively large diameter, another conductive element secured to the reduced extension of said projection, and means mounted upon said reduced extension to project said insulating projection from the electrical tension thereat.

8. A container having an insulating projection with a reduced extremity, a conductive element secured to a part of the projection of relatively large diameter, a piece of metallic gauze enveloping said projection and connected to said element, another conductive element mounted upon said extremity, and a piece of gauze enveloping said extremity and spaced from the first piece and connected to the other element.

9. A container having an insulating inwardly extending projection, a head of conductive material secured upon the end of said projection and closing said end, a terminal passing through the projection and connected to said head, at least one element of conductive material supported on said projection, and conductors uniting said head to said elements.

10. The combination of an exhausted container having a pair of oppositely located inside projections, a support clamped to each projection, each support comprising converging sections, the sections of one support being united adjacent the projection, and the sections of the other support having extensions which pass between the sections of the first support, and elements of conductive material affixed to said supports.

11. The combination of an exhausted container having inside projections at opposite points, a support clamped to each of said projections, each support comprising converging sections, the sections of one support being united adjacent the projection carrying the support, and the sections of the other support having extensions which pass between the sections of the first support and carry cross arms, and elements of conductive material affixed to the part connecting the sections of the first support and to the extensions and the cross arms of the second support.

12. The combination of an exhausted container having inside projections at oppositely located points, each projection having a reduced extremity, conductive elements of opposite polarity each affixed to one of said projections and the reduced extremity of the other projection, and terminals extending into the projections, and in connection with the elements of opposite polarity through the reduced extensions of same.

13. The combination of an exhausted container having inside projections at opposite points, each projection having a reduced extremity, conductive elements of opposite polarity, a support secured to one end of part of said elements and engaging one of said projections, a support secured to the other ends of said part of said elements and engaging the reduced extremity of the other projection, a similar support affixed to one end of the remaining elements and engaging the other projection, and a support engaging the opposite end of the remaining elements and secured to the reduced extremity of the first projection.

14. The combination of an exhausted container having inside projections at opposite points, each projection having a reduced extremity, conductive elements of opposite polarity in the container, supports affixed to the opposite extremities of part of said elements, one of said supports engaging one of said projections, and the extremity of the opposite projection, similar supports affixed to the opposite ends of the remaining elements and engaging the other projection and the reduced extremity of the first projection, and terminals extending into said projections and connected to the conductive elements through the reduced extremities of said projections.

15. An electrical condenser comprising an exhausted container having a plurality of inwardly projecting bosses, armature elements of opposite polarity in spaced relation within the container, each of the armature elements being positioned by said plurality of bosses, and terminal means for said armatures.

16. An electrical condenser comprising an exhausted container having two inwardly projecting bosses at opposite sides thereof, armature elements of opposite polarity within the container in spaced relation, the armature element of each polarity being supported and maintained in alinement by both of the said bosses, and means passing through the bosses for connecting the armature elements with an external circuit.

Signed at New York, in the county of New York and State of New York, this 25th day of February, A. D. 1925.

ALEXANDER NYMAN.